(12) United States Patent
Blumrich et al.

(10) Patent No.: US 7,788,334 B2
(45) Date of Patent: *Aug. 31, 2010

(54) MULTIPLE NODE REMOTE MESSAGING

(75) Inventors: Matthias A. Blumrich, Ridgefield, CT (US); Dong Chen, Croton on Hudson, NY (US); Alan G. Gara, Mount Kisco, NY (US); Mark E. Giampapa, Irvington, NY (US); Philip Heidelberger, Cortlandt Manor, NY (US); Martin Ohmacht, Yorktown Heights, NY (US); Valentina Salapura, Chappaqua, NY (US); Burkhard Steinmacher-Burow, Esslingen (DE); Pavlos Vranas, Danville, CA (US)

(73) Assignee: International Business Machines Corporation, Armonk, NY (US)

(*) Notice: Subject to any disclaimer, the term of this patent is extended or adjusted under 35 U.S.C. 154(b) by 349 days.

This patent is subject to a terminal disclaimer.

(21) Appl. No.: 11/768,784

(22) Filed: Jun. 26, 2007

(65) Prior Publication Data
US 2009/0006546 A1 Jan. 1, 2009

(51) Int. Cl.
*G06F 15/167* (2006.01)
*G06F 13/28* (2006.01)
(52) U.S. Cl. .................. 709/212; 709/213; 710/22

(58) Field of Classification Search .................. None
See application file for complete search history.

(56) References Cited

U.S. PATENT DOCUMENTS

| 4,777,595 | A  | * | 10/1988 | Strecker et al. | 709/236 |
| 6,072,781 | A  | * | 6/2000 | Feeney et al. | 370/282 |
| 2005/0076163 | A1 | * | 4/2005 | Malalur | 710/22 |
| 2006/0206635 | A1 | * | 9/2006 | Alexander et al. | 710/22 |

* cited by examiner

*Primary Examiner*—John B. Walsh
(74) *Attorney, Agent, or Firm*—Scully, Scott, Murphy & Presser, P.C.; Daniel P. Morris, Esq.

(57) ABSTRACT

A method for passing remote messages in a parallel computer system formed as a network of interconnected compute nodes includes that a first compute node (A) sends a single remote message to a remote second compute node (B) in order to control the remote second compute node (B) to send at least one remote message. The method includes various steps including controlling a DMA engine at first compute node (A) to prepare the single remote message to include a first message descriptor and at least one remote message descriptor for controlling the remote second compute node (B) to send at least one remote message, including putting the first message descriptor into an injection FIFO at the first compute node (A) and sending the single remote message and the at least one remote message descriptor to the second compute node (B).

26 Claims, 5 Drawing Sheets

INJECTION MESSAGE DESCRIPTOR FORMAT 139

| 16 BYTE CONTROL 139(1) | LOCAL TRANSFER FLAG (1 BIT IN 4 BYTES) 139(11) |
| --- | --- |
| | INJECTION COUNTER ID (1 BYTE IN 4 BYTES) 139(12) |
| | SEND MESSAGE ADDRESS OFFSET (4 BYTES) 139(13) |
| | MESSAGE LENGTH IN BYTES (4 BYTES) 139(14) |
| 16 BYTE NETWORK PACKET HEADER 139(2) | TORUS NETWORK HARDWARE HEADER (8 BYTES) 139(21) |
| | SOFTWARE HEADER FOR MEMORY FIFO PACKETS, OR HARDWARE HEADER FOR DMA PUT AND GET PACKETS (8 BYTES) 139(22) |

| TORUS NETWORK HARDWARE HEADER FORMAT 141 | FIFO PACKET SOFTWARE HEADER FORMAT 143 | DMA PUT/GET HARDWARE HEADER FORMAT 144 |
| --- | --- | --- |
| 1 BYTE MARKER 141(1) | 4 BYTE PUT OFFSET 143(1) | 4 BYTES PUT OFFSET 144(1) |
| 10 BIT ROUTING INFO 141(2) | 4 BYTE SOFTWARE HEADER 143(2) | 1 BYTE RDMA COUNTER ID 144(2) |
| 3 BIT PACKET SIZE 141(3) | | 1 BYTE, NUMBER OF VALID BYTES IN PAYLOAD 144(3) |
| 2 BIT TARGET NODE PROCESSOR ID 141(4) | | |
| 1 BIT DMA FLAG 141(5) | | 1 BIT IN 1 BYTE, REMOTE GET FLAG 144(4) |
| 3 BYTE TARGET (X,Y,Z) COORDINATES 141(6) | | |
| 2 BYTE RESERVED 141(7) | | 1 BYTE, INJECTION DMA FIFO ID 144(5) |

MULTIPLE NODE REMOTE MESSAGING

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract. No. B554331 awarded by the Department of Energy.

CROSS-REFERENCE TO RELATED APPLICATIONS

The present invention is related to the following commonly-owned, co-pending United States Patent Applications filed on even date herewith, the entire contents and disclosure of each of which is expressly incorporated by reference herein as if fully set forth herein. U.S. patent application Ser. No. 11/768,777, for "A SHARED PERFORMANCE MONITOR IN A MULTIPROCESSOR SYSTEM"; U.S. patent application Ser. No. 11/768,645, for "OPTIMIZED COLLECTIVES USING A DMA ON A PARALLEL COMPUTER"; U.S. Pat. No. 7,694,035, for "DMA SHARED BYTE COUNTERS IN A PARALLEL COMPUTER"; U.S. patent application Ser. No. 11/768,697, for "A METHOD AND APPARATUS OF PREFETCHING STREAMS OF VARYING PREFETCH DEPTH"; U.S. patent application Ser. No. 11/768,532, for "PROGRAMMABLE PARTITIONING FOR HIGH-PERFORMANCE COHERENCE DOMAINS IN A MULTI-PROCESSOR SYSTEM"; U.S. patent application Ser. No. 11/768,857, for "METHOD AND APPARATUS FOR SINGLE-STEPPING COHERENCE EVENTS IN A MULTIPROCESSOR SYSTEM UNDER SOFTWARE CONTROL"; U.S. Pat. No. 7,669,012, for "INSERTION OF COHERENCE EVENTS INTO A MULTIPROCESSOR COHERENCE PROTOCOL"; U.S. patent application Ser. No. 11/768,791, for "METHOD AND APPARATUS TO DEBUG AN INTEGRATED CIRCUIT CHIP VIA SYNCHRONOUS CLOCK STOP AND SCAN"; U.S. patent application Ser. No. 11/768,795, for "DMA ENGINE FOR REPEATING COMMUNICATION PATTERNS"; U.S. Pat. No. 7,680,971, for "METHOD AND APPARATUS FOR A CHOOSE-TWO MULTI-QUEUE ARBITER"; U.S. patent application Ser. No. 11/768,800, for "METHOD AND APPARATUS FOR EFFICIENTLY TRACKING QUEUE ENTRIES RELATIVE TO A TIMESTAMP"; U.S. Pat. No. 7,701,846, for "BAD DATA PACKET CAPTURE DEVICE"; U.S. patent application Ser. No. 11/768,593, for "EXTENDED WRITE COMBINING USING A WRITE CONTINUATION HINT FLAG"; U.S. patent application Ser. No. 11/768,805, for "A SYSTEM AND METHOD FOR PROGRAMMABLE BANK SELECTION FOR BANKED MEMORY SUBSYSTEMS"; U.S. patent application Ser. No. 11/768,905, for "AN ULTRASCALABLE PETAFLOP PARALLEL SUPERCOMPUTER"; U.S. patent application Ser. No. 11/768,810, for "SDRAM DDR DATA EYE MONITOR METHOD AND APPARATUS"; U.S. patent application Ser. No. 11/768,812, for "A CONFIGURABLE MEMORY SYSTEM AND METHOD FOR PROVIDING ATOMIC COUNTING OPERATIONS IN A MEMORY DEVICE"; U.S. patent application Ser. No. 11/768,559, for "ERROR CORRECTING CODE WITH CHIP KILL CAPABILITY AND POWER SAVING ENHANCEMENT"; U.S. patent application Ser. No. 11/768,552, for "STATIC POWER REDUCTION FOR MIDPOINT-TERMINATED BUSSES"; U.S. patent application Ser. No. 11/768,527, for "COMBINED GROUP ECC PROTECTION AND SUBGROUP PARITY PROTECTION"; U.S. patent application Ser. No. 11/768,669, for "A MECHANISM TO SUPPORT GENERIC COLLECTIVE COMMUNICATION ACROSS A VARIETY OF PROGRAMMING MODELS"; U.S. patent application Ser. No. 11/768,669, for "MESSAGE PASSING WITH A LIMITED NUMBER OF DMA BYTE COUNTERS"; U.S. Pat. No. 7,738,443, for "ASYNCRONOUS BROADCAST FOR ORDERED DELIVERY BETWEEN COMPUTE NODES IN A PARALLEL COMPUTING SYSTEM WHERE PACKET HEADER SPACE IS LIMITED"; U.S. patent application Ser. No. 11/768,682, for "HARDWARE PACKET PACING USING A DMA IN A PARALLEL COMPUTER"; and U.S. patent application Ser. No. 11/768,752, for "POWER THROTTLING OF COLLECTIONS OF COMPUTING ELEMENTS".

BACKGROUND OF THE INVENTION

The invention relates to parallel computer system, and more particularly relates to a remote messaging engine capable of supporting/sending multiple remote messages to multiple remote nodes comprising a parallel computer network of interconnected compute nodes, without need for compute node processor control of the remote messaging, triggered by a single send message from a source node. The remote messaging engine for multiple node remote messages, and the novel messaging operation provided thereby is set forth and described herein for the purpose of conveying the broad inventive concepts. The drawings and descriptions provided are not meant to limit the scope and spirit of the invention in any way.

Parallel computer systems include multiple compute nodes that each run threads of a global application program to accomplish tasks or processes, e.g., BlueGene/P ultrascalable Petaftop Parallel Supercomputer, by IBM Corporation. The individual compute nodes, and the instances of the global application running at the compute node carry out message passing to complete designated node-specific portions of the task or process. During message passing, an event is generated each time a message is received at a compute node comprising a parallel computer system. The compute node (and local processors) processes such events according to its inherent event-processing algorithm. In general, various devices often use a special type of event processing system for managing various messages. That is, to ensure such communication between various compute nodes comprising a parallel computer system, a standard known as message passing interface (MPI), defined by a group of organizations including various vendors and researchers is used.

MPI is the industry-standard message-passing interface. An MPI program consists of autonomous processes, executing their own code, which need not be identical. Typically, each process or application communicates via calls to MPI communication primitives, where each process executes in its own and shared memory. Such message passing allows the local processors comprising the compute node, and applications running thereon (a thread or instance of the global application or process) to cooperate with each other. Generally speaking, an MPI is an interface designed to allow a user to code data such that the local processors at the compute nodes comprising the network are able to send and receive data and information to coordinate the disposition of the global application or process. MPI is available on a wide variety of platforms ranging from massively parallel systems (IBM, Cray, Intel Paragon, etc.) to networks of workstations.

The use of Direct Memory Address (DMA) technology provides for reducing CPU (processor) workload in the management of memory operations required for messaging in any computer system, and are particularly relied on in large parallel computer systems. DMA, or DMA engines, work in conjunction with the local application or thread implementing the MPI application. Workload that would normally have to be processed by a CPU at a compute node is instead handled by the DMA engine. The use of DMA technology in large parallel computer systems is limited somewhat by such system's inherent need for tight hardware control and coordination of memory and message-passing operations. That is, required tight coupling between memory operations and CPU operations poses some challenges, including the need for a sending side compute node (a source compute node originating a message to be passed to another or multiple other compute nodes) to have awareness of the receiver node's remote address spaces, multiple protection domains, locked down memory requirements (also called pinning), notification, striping, recovery models, etc.

In parallel computer, such as the BlueGene/P, a "Rendezvous" protocol is often used to send long messages between compute nodes. Following the Rendezvous protocol, a source compute node (a thread or instance of the global application running on the sending side) sends a long message by first passing a request to send (RTS) packet to the target compute node. The RTS contains information or data identifying the source compute node and the message being sent, e.g., number of total bytes. The target compute node replies to the RTS by generating and sending a "CTS (clear to send)" packet, assuming the target compute node is able to receive. The CTS includes information or data describing the target compute node (destination side) in order to receive the entire message. Finally, the source compute node sends self-describing "data" packets to the Target node, which can arrive in any order. The packet transfer continues until the entire message has been sent. RTS packet transfers, or message transfers following the Rendezvous protocol, are ordered with respect to the transfer of other messages out of a compute node, or into a compute node, e.g., with respect to other rendezvous or eager messages.

As mentioned above, computer systems and in particular parallel computer systems such as BlueGene/P utilize DMA engines to asynchronously move data (e.g., message passing) between in-node memory and the communications network (other compute nodes). DMA engines operate under a set of constructs used by message passing libraries (as in MPI) to set up and monitor completion of DMA data transfers. In large parallel computer systems such as BlueGene/P, DMAs may be fabricated within or integrated into the same ASIC comprising the node's processors. As such, size is a consideration and therefore such DMAs often have finite resources, for example, byte counters to tracks the number of bytes sent or received in a DMA transfer, which must be managed wisely to maximize the exchange of the many messages (at the compute node comprising the DMA channel). In peak performance applications, many outstanding messages might be regularly outstanding that must be managed by the DMA engine before data transfers.

Message passing libraries used for DMA message transfer in parallel computer systems inefficiently implement known rendezvous protocol for some applications. Before the instant invention, it has been unknown for conventional parallel computer systems to operate with DMA engines that have inherently limited numbers of byte counters and other registers because of size constraints. Until the recent development of IBM's BlueGene/P ultrascalable Petaflop Parallel Supercomputer, which includes compute nodes with DMA engines integrated within a single ASIC core (and therefore a limited number of byte counters), efficiency utilizing such a limited number of byte counters was not a priority for computer designers. Hence, other versions of the rendezvous protocol to provide for a DMA engine's efficient management of a limited number of counters are unknown, and would be desirable for use in a supercomputer such as BlueGene/P.

For that matter, commonly-owned co-pending U.S. patent application Ser. No. (YOR820070343), entitled: DMA Shared Byte Counter In A Parallel Computer, filed concurrently and incorporated by reference herein, discloses a DMA engine for use in a parallel computer system, a method for passing messages using such a DMA engine in a parallel computer system and a parallel computer system utilizing the novel DMA engine for sharing of byte counters by multiple messages. The aforementioned DMA Shared Byte Counter, however, is unable to determine (the application thread running at a compute node and using the local DMA engine for message-passing) whether a message that is using a shared byte counter has been completed other than at the time when it can be determined that all of the messages (message packet transfers) sharing the shared byte counter have completed.

Direct memory access (DMA) allows certain hardware sub-systems within a computer or computer system to access system memory for reading and/or writing independent of the central processing unit, or multiple central processing units in the case of parallel computers and computer systems. DMA use is made by disk drive controllers, graphics cards, network cards, sound cards and like devices. Computer systems that employ DMA channels can transfer data to and from devices with much less CPU overhead as compared to computer systems without a DMA channel.

A DMA transfer comprises copying a block of memory from one device to another (comprising the computer system). The CPU initiates the DMA transfer, but the DMA carries out the task. For what is known in the art as "third party" DMA, for example, as used in conjunction with conventional ISA bus operation, a DMA controller or engine that is normally part of the motherboard chipset performs the transfer. For example, the BlueGene/P, a parallel multi-computer system by International Business Machines (IBM), includes a DMA engine integrated onto the same chip as the processors (CPUs), cache memory, memory controller and network logic.

DMAs are used conventionally to copy blocks of memory from system RAM to or from a buffer on the DMA device w/o interrupting the processor, which is quite important to high-performance embedded systems. DMA is also used conventionally to offload expensive memory operations, such as large copies from the CPU to a dedicated DMA engine. For example, a "scatter gather" DMA allows the transfer of data to and from multiple memory areas in a single DMA transaction. Scatter gather DMA chains together multiple simple DMA requests in order to off-load multiple input/output interrupt and data copy tasks from the processor or CPU.

In a DMA engine for transferring data from a network interface the CPU provides destination address for moving data from the network interface to the memory. Length of packets or their semantics received from the network interface are not know in advance. Multiple packets can contain various parts of a single data message/transfer, such as in MPI messages. A DMA engine moves received packets to destination addresses without Packet reordering if received out-of-order. Storing packets in a single continuous address space if packets are part of a single message. Some network protocols such as MPI with rendezvous protocol support acknowledgement means to allow to the other party transfer of large messages using a number of packets. Destination address for the whole data block in a continuous address space at the receiver side provided by the receiver ahead of time/at the beginning of transmission to the transmitter side.

What would be desirable in the field of parallel computer systems and their design, and in particular in parallel computer systems including DMA engines constructed to perform remote message sends to remote compute nodes comprising the parallel computer system automatically in hardware without core processor (e.g., CPU) involvement, triggered by a single message from a source compute node.

SUMMARY OF THE INVENTION

This invention describes a parallel computer system comprising a network of interconnected compute nodes, where each compute node comprises a plurality of processors, a memory and direct memory access engine (DMA) constructed for passing at least one remote message triggered by a first single source compute node (A) sending a single message. The DMA engines of the interconnected compute nodes comprise a processor interface for communicating with said plurality of processors, DMA logic; injection and reception byte counters; injection and reception FIFO metadata; a memory interface and a DMA network interface. The parallel computer system further includes that the DMA engines provide for putting remote descriptors from the first single source compute node (A) into an injection FIFO at remote second compute node (B). The parallel computer system may include as well that the first single source compute node (A) implements a $3^{rd}$ party send by sending a single remote first message including at least one remote message descriptor to a remote second compute node (B), to control the remote second compute node (B) to send a second data message, and wherein remote second compute node (B) sends said second data message to third compute node (C).

Moreover, the parallel computer system may include that the first compute node (A) implements at least one $3^{rd}$ party send by sending a single remote get message including at least one remote message descriptor to a remote second compute node (B), which upon receipt controls the DMA engine to pass at least one data message corresponding to the at least one remote message descriptor. The parallel computer system may include that the wherein remote second compute node (B) sends said multiple data messages to a third remote compute node (C), and/or that the remote second compute node (B) sends said multiple data messages to the first compute node (A), and/or that the remote second compute node (B) sends multiple data messages to multiple compute nodes, where each of the multiple data messages corresponds to each of multiple message descriptors.

The invention also includes a method for passing remote messages in a parallel computer system comprising a network of interconnected compute nodes, wherein a first compute node (A) sends a single remote message to a remote second compute node (B) in order to control said remote second compute node (B) to send at least one remote message. The method includes controlling a DMA engine at first compute node (A) to prepare the single remote message to include a first message descriptor and at least one remote message descriptor for controlling remote second compute node (B) to send at least one message, including putting the first message descriptor into an injection FIFO at the first compute node (A) and sending the single remote message and the at least one remote message descriptor to the second compute node (B).

BRIEF DESCRIPTION OF THE DRAWING FIGURES

The objects, features and advantages of the present invention will become apparent to one skilled in the art, in view of the following detailed description taken in combination with the attached drawings, in which.

DETAILED DESCRIPTION OF THE INVENTION

The present invention provides for remote message passing operation in a distributed memory parallel computer system such as IBM, Inc.'s ultrascalable petaflop parallel supercomputer, as described in commonly-owned, pending U.S. patent application Ser. No. 11/768,905, filed concurrently herewith and entitled: ULTRASCALABLE PETAFLOP PARALLEL SUPERCOMPUTER, incorporated by reference herein. The novel ultrascalable petaflop parallel supercomputer may achieve 1 or multi petaflops, with up to 458,752 cores, or 114,688 nodes. The supercomputer is based upon System-On-a-Chip technology, where each processing node comprises a single Application Specific Integrated Circuit (ASIC), preferably comprises four (4) integrated processor cores.

The ASIC nodes are interconnected by multiple independent networks that optimally maximize communications throughput and minimize latency. The multiple networks may include three high-speed networks for parallel algorithm message passing including a Torus with DMA (direct memory access), collective network, and a Global Asynchronous network that provides global barrier and notification functions. These multiple independent networks may be collaboratively or independently utilized according to the needs or phases of an algorithm for optimizing algorithm-processing performance.

At least four modes of operation are supported: virtual mode, SMP 1-core mode, SMP 4-core mode and dual mode. In the virtual node mode, each of the processing cores will perform its own MPI (message passing interface) task independently. Each core uses a quarter of the memory (L3 and DRAM) of the node, while coherence among the four MPI within the node and across the nodes is maintained by MPI. In the SMP (Symmetric Multi Processor) 1-core mode, one core performs a single MPI task, using the entire memory capacity of the node. In the SMP 4-core mode, one MPI task with 4 threads is running, using the whole node memory capacity. The fourth mode is called the dual mode. In this hybrid case, two SMP MPI tasks are running, with each SMP using 2 cores running a thread each. Finally, one can also support modes such as a 1, 3 split, and 1, or 2 or 3 cores idling. Thus a node can trade off amount of memory versus parallelism, a feature unique to this supercomputer.

Because of the torus's DMA feature, internode communications can overlap with computations running concurrently on the nodes. Also complex forms of messaging protocols, particular arithmetic functions, often called "reduction functions", are required to be invoked on message data as it arrives. One computer node core may be implemented to perform these functions without distracting computations on other cores. Additionally, the application is able to define arbitrarily complex reduction functions, supporting new algorithmic development that overlaps computational power with communication activities. For particular classes of parallel algorithms, or parts of parallel calculations, this architecture may apply the power of some or all cores to work in collaboration on communication activities.

The novel ultrascalable petaflop parallel supercomputer architecture allows the multiple networks to be utilized simultaneously, independently, or in collaboration. Because of the system-on-a-chip level integration, in collaboration with operating system software designed to take advantage of this architecture, alternating between such modes of operation can occur with minimal overheads. In cases where the computation is awaiting message arrival, this may happen automatically.

To connect nodes, multiple network paradigms are implemented to interconnect nodes for use individually or simultaneously, and include three high-speed networks for parallel algorithm message passing. Additional networks are provided for external connectivity and are used for Input/Output, System Management and Configuration, and Debug and Monitoring services for the supercomputer nodes. The high-speed networks preferably include n-dimensional Torus, collective network, and Global Signal configurations. The use of each of these networks may switch back and forth based on algorithmic needs or phases of algorithms. For example, parts of calculations may be performed with the Torus, or part on the collective network, which facilitates the development of new parallel algorithms that simultaneously employ multiple networks in novel ways.

Each node comprises a single ASIC and a plurality of SDRAM-DDR2 memory chips. The nodes are interconnected through at least six (6) networks, the highest aggregate bandwidth of which is a nearest neighbor link that maps the nodes into a physical 3-dimensional torus. The interconnect structure comprises a torus with preferably no asymmetries as the compute nodes communicate with the same bandwidth and nearly the same latency to nodes that are physically close as to those which are physically located on neighboring racks. Such interconnect structure facilitates simpler programming models. The ASICs that power the nodes are based on system-on-a-chip (s-o-c) technology and incorporate all of the functionality needed by the system. The ASICs or compute nodes include 8 MB or more of extremely high bandwidth embedded DRAM. The compute nodes are physically small, allowing for a very high density of processing and optimizing cost/performance.

In a preferred embodiment, the system packaging comprises 512 processing nodes on a doubled-sided board or "midplane". Each processing or compute node contains 4 processor cores for handling computation and message passing operations. In addition, associated with a prescribed plurality of processing nodes is a dedicated node that comprises a quad-processor with external memory, for handling of I/O communications to and from the compute nodes. Each I/O node has an operating system (Linux based) that can handle basic tasks and all the functions' necessary for high performance real time code. For compiling, diagnostics, and analysis, a host machine running a global application is required.

The I/O compute nodes contain a software layer above the layer on the compute nodes for handling host communications. The choice of host compute node depends on the class of applications, their bandwidth needs and performance requirements.

As used herein, two packet types are distinguished, general packets and special packets. General packets are handled by DMA engines at compute nodes comprising the parallel computer system similar to conventional transfers, and special packets are handled by the novel processing ability of the invention, and contain the destination address(es) where the special packets are to be stored. The invention detects special packets, extracts destination addresses from the packets and reorders the packets if received out-of-order. The novel parallel computer system, DMA engine, and method for message passing tracks the number of received packets, or the number of outstanding packets by using DMA channel byte counters.

Special packets are part of a long message (data transfer) partitioned into multiple packets which are to be stored into continuous address space for further handling by the application. Special packets contain a destination address on the receiver side as a part of the packet header, extended header or payload. The destination address is disclosed by the receiver during the rendezvous prior to the message start or at the beginning of data transfer. Special packets are identified by one or more bits in the packet header. For that matter, the packet header contains one or more fields to specify packet type (Dm): 0—general packet; and 1—special packet. Special packets contain several bytes to specify the destination address, or address offset in the receiver address space, "Put offset" fields, packet header, extended header or payload contain information on channel, and VC fields, and are constructed to support one or more channels to keep track of one or more data streams. In preferred embodiments the parallel computer system, DMA engine, and novel message passing operation of the invention include that one or more DMA channels for data reception are supported, and can receive several intermixed packet streams by keeping track of number of received and outstanding packets belonging to a single message/packet stream. This is implemented using injection and reception byte counters in each DMA channel, which are set at the beginning of the reception of a packet stream at the remote compute node. The reception or injection byte counters use a specified number of bytes, or specified number of packets that will be received. That is, at the reception of a packet, a channel field in the packet identifies the channel and the corresponding channel counter is updated (decremented by the number of valid data bytes in the package). When the channel counter reaches 0 all packets/bytes have been received. The channel then notifies the processor by raising the interrupt or uses some other means for processor notification (like polling).

Figure 1:
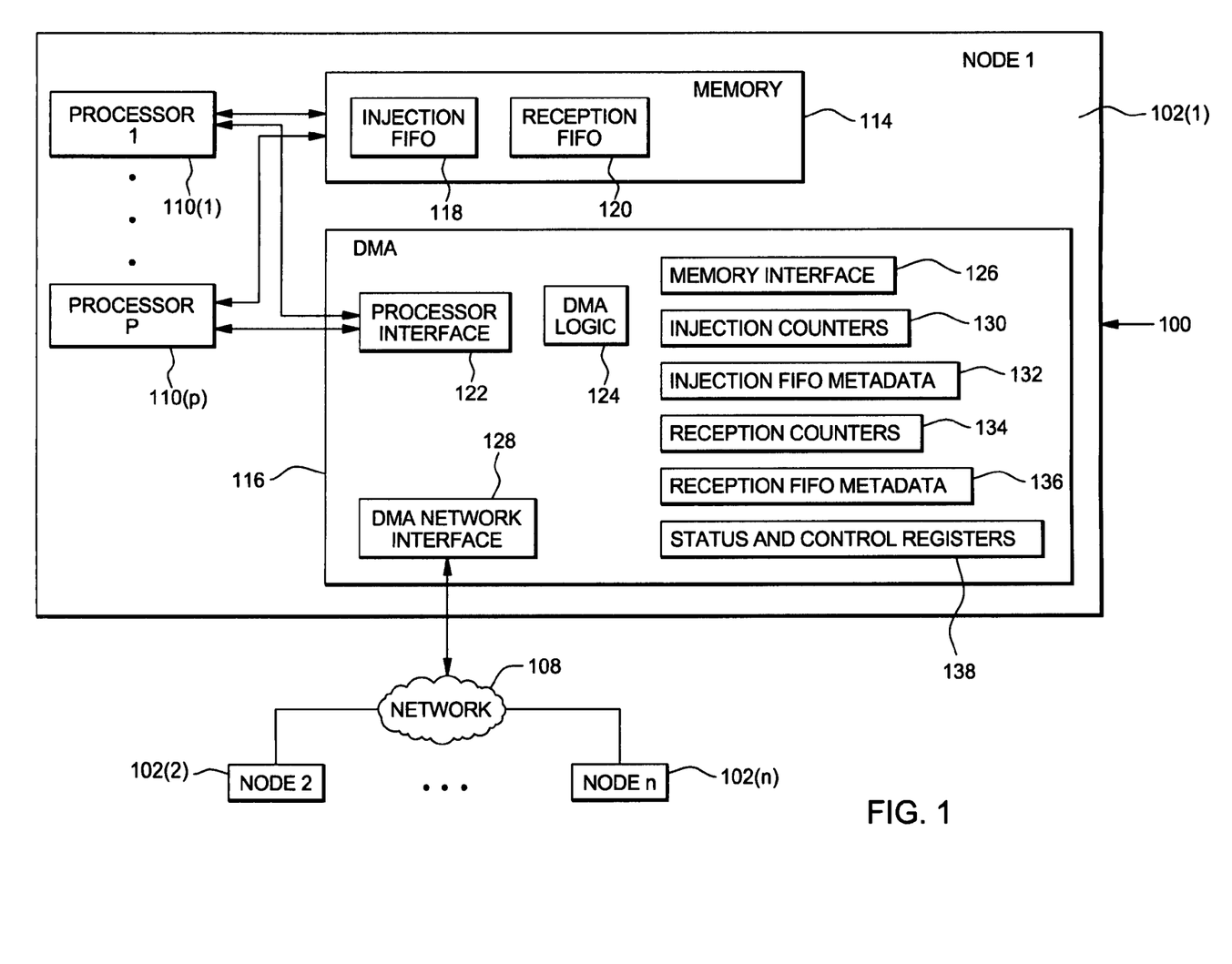
FIG. 1 is one embodiment of a parallel computer system comprising multiple interconnected computer nodes and novel DMA engine for remote message passing of this invention.

FIG. 1 herein is a block diagram illustrating an ultrascalable petaflop parallel supercomputer ("parallel computer system 100") of the invention including the novel message passing using a limited number of DMA byte counters. Parallel computer system 100 comprises a plurality of individual compute nodes 102(1), 102(2) . . . 102(n), which as mentioned are constructed as single ASICs and interconnected across network 108. FIG. 1 highlights a preferred construction of one of the compute nodes, ASIC 102(1), constructed in accordance with the principles of the invention. Each of compute nodes (102(n)) with the exception of the internal DRAMs (not shown in FIG. 1 but connected to memory 114) is fabricated to integrate all the functions of a computer into a single compute ASIC to enable a dramatic reduction in node size and power consumption. In a supercomputer, or parallel computer system, the reduced node size and its lower power consumption provides for increased node density thereby decreasing the overall cost/performance for the parallel computer system (100).

In more detail, compute node or ASIC 102(1) may function as both a compute node and an I/O node in the parallel computer system (100). Compute node 102(1) comprises a plurality of processors or processor cores, 110(1), . . . 110($p$), but preferably four ($p=4$). Each of the processor cores (110($p$)) includes a "double" floating point unit that includes two coupled standard floating point units. This arrangement gives a peak performance of four floating point operations per processor core per clock cycle. Preferably, each processor core comprises a PowerPC450 embedded core available from IBM microelectronics. The skilled artisan should note that future versions of this core may be used as technology improves, without deviating from the scope and spirit of the invention. A description of the functionality of such a PowerPC450 core may be found at http://www.ibm.com/chins/power/powetpc/.

Besides the embedded processing cores 110($p$), and floating point cores (not shown in FIG. 1), parallel computer system 100 includes a DMA 116, and an embedded eDRAM (memory 114). eDRAM 114 includes injection 118 and reception FIFO 120, and is controlled an integrated external DDR2 memory controller (not shown in FIG. 1) and DMA (116). DMA 116 consists of a processor interface 122, DMA logic 124, a memory interface 126, and a DMA network interface 128, injection counters 130, injection FIFO descriptor 132, reception counters 134, reception FIFO descriptor 136 and status and counter registers 138. The injection FIFO descriptor 132 describes where in memory (114) the Injection FIFOs 130 are located and the current head and tail of the FIFOs. The Reception FIFO descriptor 136 describes where in memory the Reception FIFOs 120 are located and the current head and tail of the FIFOs.

DMA 116 directly controls transfer of long messages, which long messages are typically preceded by short protocol messages that are deposited into reception FIFOs on a receiving node (for example, compute node 102(2)). Through these protocol messages, the sender compute node and receiver compute node agree on which injection counter (130) and reception counter (134) identifications to use, and what the base offsets are for the messages being processed. Long message transfer may be initiated by a core processor on the sending node by placing a "put" message descriptor into an injection FIFO 118 (in memory 114), writing the injection counter base and value via writes via the DMA (processor) interface 122, and appropriately modifying the injection FIFO descriptor 132 for that message. This includes advancing a tail pointer indicating the "last" message descriptor in the via a "write" to the DMA processor interface 122. DMA logic 124 reads the injection FIFO descriptor 132 and recognizes which FIFOs have messages to be sent.

The DUMA logic causes the memory interface 126 to read the descriptor in the Injection FIFO 118. The put message descriptor includes the injection (130) and reception counter (134) identifications to be used, the message length, the initial injection and reception offsets of the message, the destination node and other network routing information. The DMA 116 begins fetching the message and assembling it into packets to be "put" on to the network (108). Each packet contains an offset from the reception counter (134) where the data from this packet is to be stored, and a count of how many bytes in this packet should be written. DMA 116 is responsible for updating this information correctly for each packet, and puts the packets into the network interface 128 (when space is available), at which time the packet enters the network and is routed to the destination compute node (e.g., compute node ($p$)).

After DMA 116 puts the message in the network interface 128, it decrements the specified injection counter 130 by the number of bytes in the packet. Upon reaching the destination, the packet is put into the network interface at that compute node (e.g., 102($p$), and the node's local DMA "recognizes" that the packet is there. The receive compute node DMA reads the reception counter id, offset and count from the received packet, looks up the reception counter base address, writes the appropriate number of bytes starting at the base plus packet offset, and then decrements the counter value by the bytes.

If a remote get operation is used, instead of the processor on the sending node injecting a descriptor into the injection 118, the receiving node sends a short get message (which contains a put descriptor) to the sender compute node (e.g., 102($p$)), and the DMA logic at the sender compute node puts this descriptor into its associated injection FIFO, and advances that FIFO's pointers appropriately. To share a byte counter, the base address of the shared counter must be set to a value smaller than the base address of any message to be using that counter. The initial value of the counter is set to zero. The initial offset in a message descriptor is the message's starting address minus this base offset. The particular processor increments the counter value by the current message length, and in accordance with the novel operation, said processor need only know the current message length, but not the lengths of the other messages using this counter, nor the number of bytes that have already been received.

Network 108 preferably displays a 3-dimensional torus functionality, providing all the network link cut-through routing buffers and routing control block that allow any two nodes to communicate with low latency. The four (or "p") processor cores embedded in ASIC (node 102(1)) as shown may be utilized for message handling and computation operations. Virtual cut-through torus routing is supported in a hardware block, which is integrated into the compute nodes (102($p$)) to allow for the elimination of the network adapter, typically required in conventional parallel computer system operation. Preferably, a virtual channel routing network is supported with two (2) dynamic and two (2) deterministic channels.

The same compute node ASIC construction is used as an I/O node, which is associated with a subset of the compute nodes (e.g., 16, 32, 64, or 128 compute nodes), for handling fileserver communication and I/O operations. The only difference between an I/O compute node and a computation compute node is that an I/O node enables and uses an external network interface, such as the 10 Gigabit Ethernet (not shown). While the compute nodes may have the integrated 10 Gb Ethernet (they share a common ASIC), for purposes of discussion, the 10 Gb Ethernet interface is enabled at the I/O nodes only. The 10 Gb Ethernet functional units (XEMAC, ToMAL) interfaces to an arbiter, which arbitrates inputs to L3 from torus DMA 116 and from the 10 Gb Ethernet (not shown). This allows the processor within a node to set up a transfer and return to handling messages with very little overhead.

As indicated herein, it should be understood that the present invention could be realized in hardware, software, or a combination of hardware and software, such as in the ultrascalable petaflop parallel supercomputer described above. The invention, however, is not limited to applications therein, but may be implemented in any kind of parallel computer/server system(s)—or other parallel computer system adapted for carrying out the novel message passing network interface for repeat communications described herein. A typical combination of hardware and software could be any general-purpose multiple parallel computer system or network with a computer program that, when loaded and executed, carries out the respective methods described herein. Alternatively, a specific use parallel computer system, or linked computer network, containing specialized hardware for carrying out one or more of the functional tasks of the invention, could be utilized.

For that matter, the present invention can also be embodied in a computer program product, which comprises all the respective features enabling the implementation of the methods for utilizing the network interface described herein, for example, the exemplary methods depicted in figures herein, and which product—when loaded in the parallel computer system or network, is able to carry out these and related methods. Computer program, software program, program, or software, in the present context mean any expression, in any language, code or notation, of a set of instructions intended to cause a parallel computer network or system having an information processing capability to perform a particular function either directly or after either or both of the following: (a) conversion to another language, code or notation; and/or (b) reproduction in a different material form.

Figure 2:
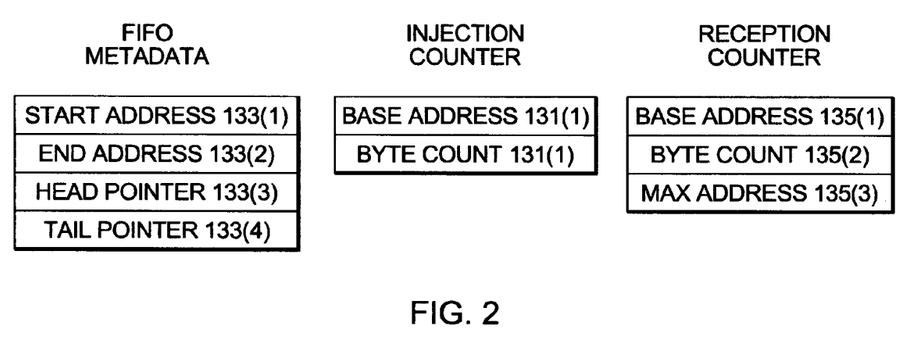
FIG. 2 is a detailed view of some features of the novel DMA engine of FIG. 1.

FIG. 2 herein describes the injection and reception FIFOs (as FIFO registers, broadly) of DMA 116, as well as injection and reception counters. Processor interface 122 within the DMA provide or allow processors on the same compute ASIC chip (comprising a compute node such as node 102(*n*) program the DMA, and read the status registers (as described in detail above). When a compute node is sending a message, its DMA injects the message by reading data from main memory 114 through L3 cache or memory interface 126, and writes into the torus network via the DMA network interface 128. When it is receiving, DMA 116 transfers data from the torus network (reading from DMA network interface 128) and writes data back into the main memory through the L3 cache or memory interface 126. The main DMA internal registers comprise 128 injection FIFOs, 256 injection counters, 32 reception FIFOs, 256 reception counters, and various status and interrupt bits, such as to flag when a FIFO crosses a threshold, or when a count-down counter becomes zero.

Each FIFO (injection or reception) comprises 4 FIFO registers, as shown in FIG. 2. When a FIFO is programmed, a physical address range of the main memory from a start address is maintained in start address register 133(1), to the end address maintained in end address register 133(2) for the FIFO shown. A head pointer register 133(3) and tail pointer register 133(4) indicates where the valid data are (in memory 114). The valid data exist in memory within the range of the start address and end address under the control of either the DMA, or an instance or thread of a global application running on the processors (110(*p*)), depending on the particular operating mode. Injection counters 130 (FIG. 1) are shown in FIG. 2 to include a base address register 131(1) and a byte count register 131(2). Reception counters 134 also contain a base address register 135(1), a byte counter register 135(2), and an additional maximum (max) address 135(3).

Upon initialization, the head and tail pointer registers 133(3), 133(4) of an injection FIFO 132 are set to the start address contained in register 133(1). The thread or instance of the global application running at the compute node write injection descriptors into the injection FIFO 118 and move the tail pointer in tail pointer register 133(4). The DMA 116 detects that the head and tail points (as maintained in head (133(3)) and tail (133(4))) registers are now different. The DMA therefore begins processing the descriptors maintained in the FIFO. Each injection descriptor is 32 bytes long, and corresponds to one message to be sent over the network (injection descriptors are essentially messages, which identify data for transfer by the message). Once a message is sent, the DMA moves the head pointer up by 32 bytes (in head pointer register 122(3), until it reaches the value maintained in the tail pointer register 133(4). When either the head or tail pointer reaches the end address maintained by register 133(2), they wrap back to start address (in start address register 133(1)). The thread or instance of the global application program "wraps" back the tail pointer, and the DMA 116 automatically, and without processor interaction (or interruption) controls the head pointer wrap back.

The valid descriptors are stored in memory 114 within memory addressed extending (1) from the head pointer to the tail pointer, if the number maintained in the tail pointer register (133(4)) is larger than the number maintained in the head pointer register (133(3)), or (2) if from the address represented by the number maintained in the head pointer register to the end address maintained in the end address register, then from the start address in the start address register to the tail pointer as maintained in the tail pointer register, if the number in the tail pointer register is less than the number maintained in the head pointer register.

Figure 3:
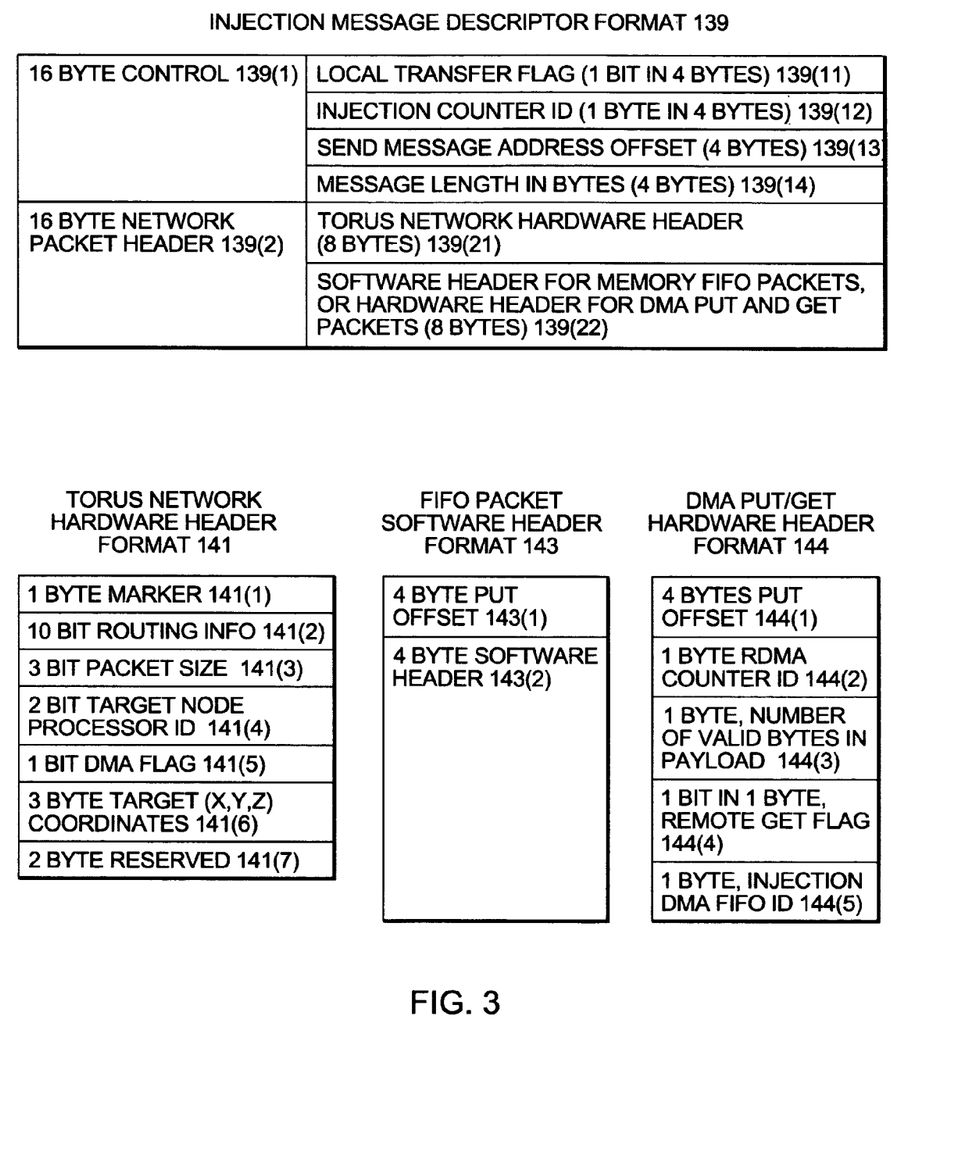
FIG. 3 is a more detailed view of the several features of the novel DMA highlighted in FIG. 2.

FIG. 3 herein depicts injection FIFO descriptor format (139), torus network hardware header format 141, FIFO packet application header format 143 and DMA put/get hardware header format 144. With respect to the FIFO descriptor format 139, a 32 byte descriptor is includes to describes complete message, and as shown in injection descriptor format 139, includes a 16 byte control field (139(1)), which contains information local to a compute node, and a 16 byte network packet header 139(2), the packet header to be sent over the network along with the message data. Control field (139(1)) includes a local transfer flag (139(11)) to indicate whether the message is a local transfer. If the local transfer flag is set to 1, then the current message will be transferred from local memory to local memory, without going out onto the torus network. Each message also has an associated injection counter ID (139(12)). The injection counter base address 131(1) is added to a send message address offset (139(13)), to form the actual beginning physical address of the message data. A message length field 139(14) maintains for the DMA 116 the length of the message in bytes.

The 16 byte network packet header 139(2) includes a torus network hardware header 139(21) containing 8 bytes, and an application header for memory FIFO packets or a DMA put/get hardware header 139(22). When sending over the torus network, a long message is broken into smaller packets. On Blue Gene/L and P, the torus network packet size ranges from 32 bytes to 256 bytes, in increments of 32 bytes. Torus network hardware header format (141) depicts in detail the breakdown of headers included in torus network hardware header 139(21). These include "1 byte marker" 141(1) that indicates the beginning of a data packet, where "10 bits routing info" 141(2) contains the torus routing information. A "3 bits-packet size" field 141(3) determines the packet size, and a "2 bits target node processor" field 141(4) maintains a processor core for a message. The destination node is determined by a "3 bytes target node (x,y,z) coordinates (141(6)). Because there are 4 processors on a Blue Gene/P compute chip, a 2 bit processor ID field is sufficient in the instant compute node embodiment. A 1 bit DMA flag 141(5) and the 8 byte DMA header 139 (22) are used by the receiving node to decode the packet.

The receiving DMA handles 3 types of packets, a memory FIFO packet, a put packet or a get packet. When the DMA flag 141(5) in the torus header is set to 0, the packet is a memory FIFO packet. The memory FIFO packet is put into one of the reception FIFOs on the receiving node. The reception FIFO mapping is done locally at the receiving node, depending on the status of "2 bits target node processor ID (flag) 141(4). A reception FIFO is handled in a manner similar to that of an injection FIFO, except that the data packets have sizes from 32 bytes to 256 bytes, and the DMA moves the tail pointer 133(4) and the application thread running on the processors (comprising the compute node) moves the head pointer 133 (3).

The application header for memory FIFO packets or DMA put/get hardware header 139(22) comprise a FIFO packet application header format 143, or DMA put/get hardware header 144. The FIFO packet application header format 143 includes a "4 byte put offset (143(1)) and a 4 byte application header 143(2). Since a long message is broken into smaller packets, the "sending" DMA updates both the send message address offset 139(13) and 4 byte put offset 143(1) after each packet is sent. The packets can arrive at a destination node out of order. The 4 byte put offset 143(1) provides for reordering the packets for the receiving compute node processor(s) to reassemble a FIFO message. The 4 byte application header 143(2) is not used by the DMA for FIFO packets, and usually contains a function ID that the receiving node will execute once the packet is received.

When the 1 bit DMA flag 141(5) is set to 1 (in torus network hardware header 141), the FIFO packet application header format 143 is then replaced with the DMA put/get header format 144. Therein, if a remote get flag (144(4)) is set to 0, then the packet is a "put" packet, and 4 byte put offset 144(1) field, and 1 byte rdma counter ID (144(2)) field are used. The 4 byte put offset field (144(1)) is the put offset in bytes, as is found in the FIFO packet. For each packet received, the receiving DMA will look up a reception counter, identified in the DMA put/get header format 144 by the 1 byte rdma counter ID (144(2)). The counter's base address 135(1) is added to the 4 byte put offset 144(1) to form the actual physical address of the packet's data payload or the receiving node. A "1 byte, number of valid bytes in payload" 144(3) contains the number of valid bytes in the payload. In typical long message transfers, the sending node sets up an injection counter and a receiving node sets up a reception counter with the total number of bytes in byte counter 131(2), and byte counter 135(2) to be transferred in the message via a remote put. The DMA 116, after sending/receiving each packet, will update the byte counter by subtracting the number of valid bytes in the packet data payload. When the byte count reaches 0, the message transfer is complete.

The $3^{rd}$ DMA operating mode is remote get. In this case, a remote get flag 144(4) is set to 1, and 4 byte put offset 144(1) field, 1 byte rdma counter ID (144(2)) field are not used. On a sending node A, the injection DMA does the similar work as a remote put packet except that a message is fully contained in one torus packet. The data payload that node A sends to node B, contains a 32 byte descriptor for node B, to be put into a "1 byte, injection FIFO with FIFO ID (144(5)). Once the packet is received on node B, node B puts the descriptor contained in the packet payload into its injection FIFO, then sends the data related to this descriptor back to node A.

Figure 4:
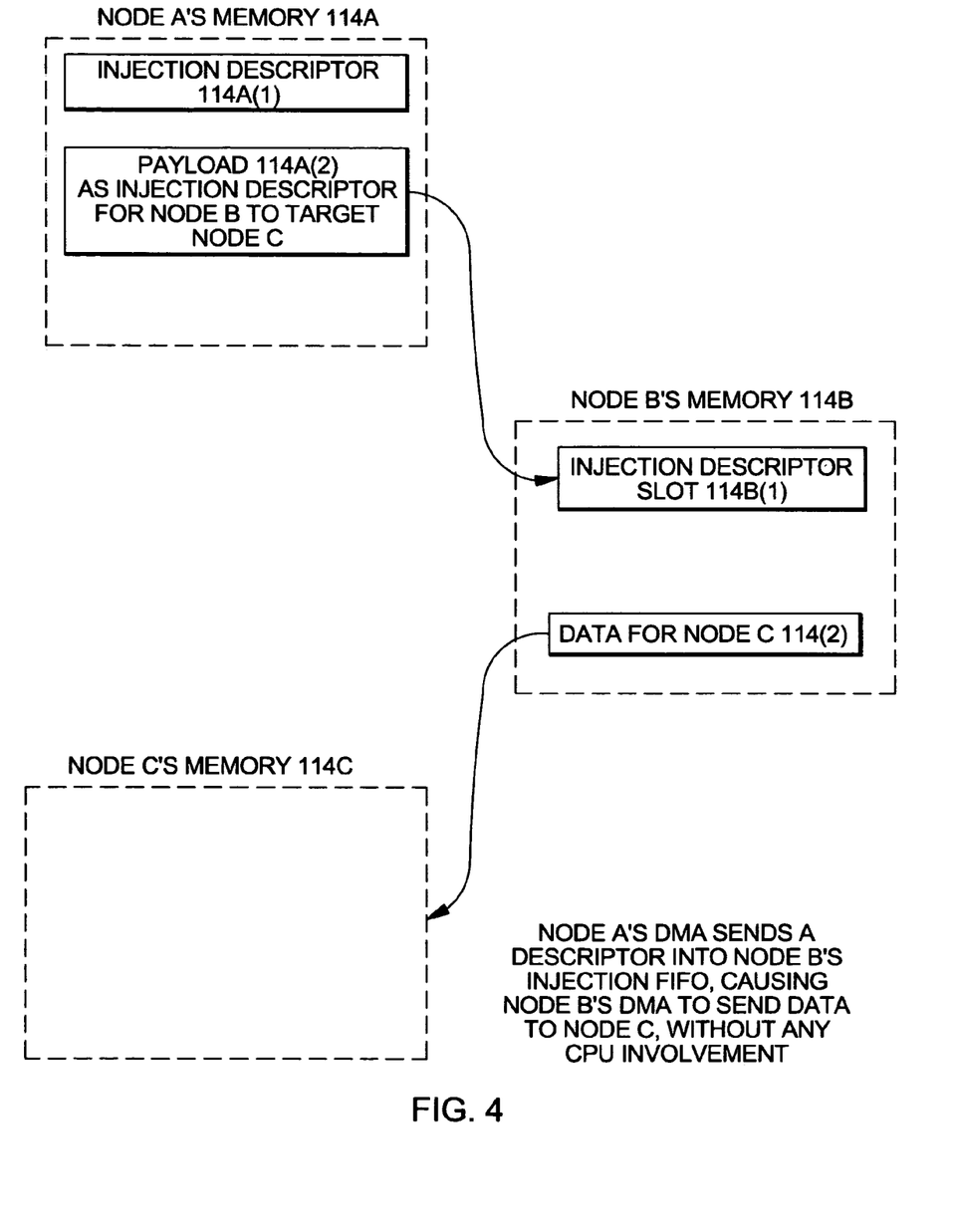
FIG. 4 depicts one embodiment of a DMA-based message passing method of the invention for implementing third-party sends.

While the above-described is the standard mode RDMA remote get supported by the Blue Gene/P hardware, the novel construction also provides for new multiple node messaging operations, based in the ability to directly send a descriptor into a receiving node's injection FIFO. For that matter, FIGS. 4 and 5 herein highlights operation whereby the invention carries out third party sends. That is, and as shown in FIG. 4, a compute Node A's memory 114A prepares 2 descriptors. One descriptor is an injection descriptor 114A(1) with the "1 bit in 1 byte remote get flag" 144(4) set to 1, targeting a receiving node B. The payload descriptor 114A(2) for injection descriptor 114A(1) is an injection descriptor for node B to send data to Node C. Node A sends this packet to node B, and Node B puts the payload descriptor 103 in the payload into an injection FIFO descriptor slot 114B(1) of compute node B's memory 114B. Then, compute node B processes this injection FIFO descriptor and sends "data for compute node C" 114B(2) to memory 114C in compute node C. All of the data transfers except for the 2 descriptors prepared on Node A are done with DMA hardware without any processor involvement.

Figure 5:
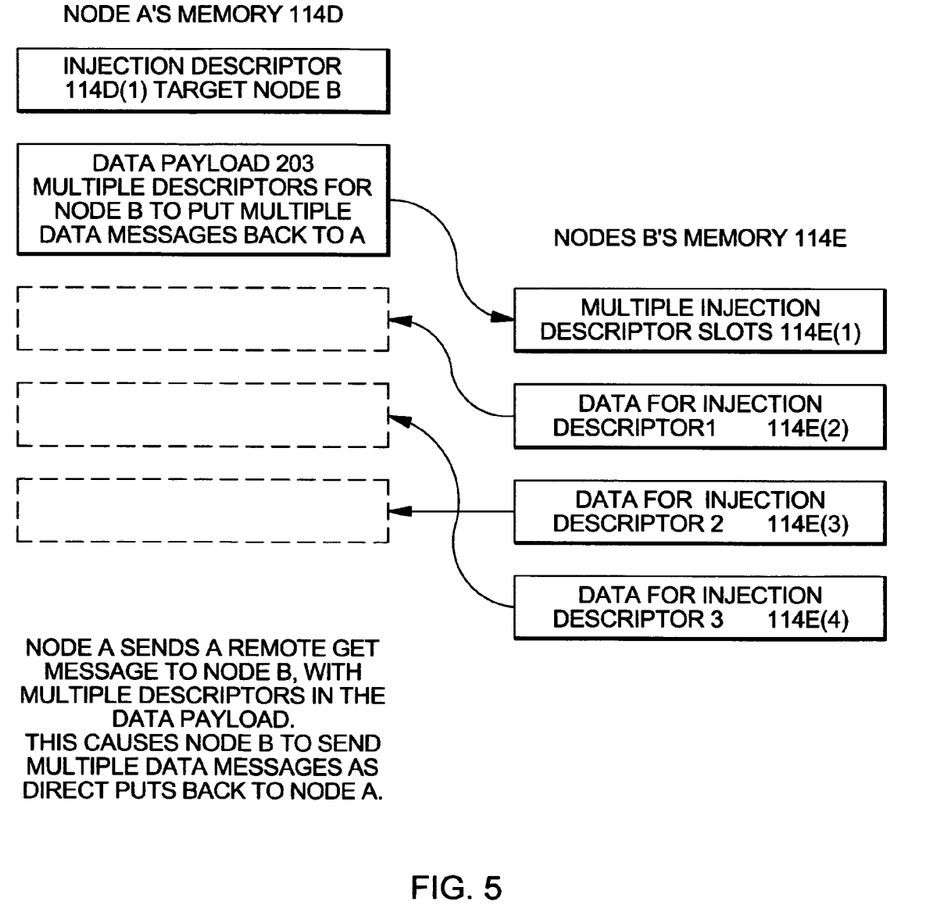
FIG. 5 depicts one embodiment of an alternative DMA-based remote message passing method of the invention.

FIG. 5 shows a $2^{nd}$ method where node A requests multiple messages from node B with a single remote get packet to node B. Again, node A prepares in its memory 114D an injection descriptor 114A(1) for its remote get message, targeting node B, and data payload and multiple descriptors 114A(2) for node B to send several put messages back to node A. Then, node A sends this packet to node B, where the multiple injection (put) descriptors 114E(1) are put into injection FIFO slots on node B. Node B processes these injection FIFO descriptors and sends data for "injection descriptor 1" 114E (2), data for "injection descriptor 2" 114E(3) and data for "injection descriptor 3" 114E(4) back to node A.

The first method of $3^{rd}$ party send can be extended to a multiple party (that is, multiple node send as Node A could ask Node B to send a descriptor to Node C, resulting in Node C send data to Node D, etc.

The first and second method can also be combined to have node A send a single packet to node B, resulting in node B sending multiple messages to multiple targets.

The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention.

The invention claimed is:

1. A parallel computer system comprising a network of interconnected compute nodes, where each compute node comprises a plurality of processors, a memory and direct memory access engine (DMA) constructed for passing at least one remote message triggered by a first single source compute node (A) sending a single message, wherein the DMA engines of the interconnected compute nodes comprise:
    a processor interface for communicating with said plurality of processors;
    DMA logic;
    injection and reception byte counters;
    injection and reception FIFO metadata;
    a memory interface; and
    a DMA network interface.

2. The parallel computer system as set forth in claim 1, wherein the DMA engines provide for putting remote descriptors from the first single source compute node (A) into an injection FIFO at remote second compute node (B).

3. The parallel computer system as set forth in claim 1, wherein the first single source compute node (A) implements a $3^{rd}$ party send by sending a single remote first message including at least one remote message descriptor to a remote second compute node (B), to control the remote second compute node (B) to send a second data message, and wherein remote second compute node (B) sends said second data message to third compute node (C).

4. The parallel computer system as set forth in claim 1, wherein the first compute node (A) implements at least one $3^{rd}$ party send by sending a single remote get message including at least one remote message descriptor to a remote second compute node (B), which upon receipt controls the DMA engine to pass at least one data message corresponding to the at least one remote message descriptor.

5. A parallel computer system comprising a network of interconnected compute nodes, where each compute node comprises a plurality of processors, a memory and direct memory access engine (DMA) constructed for passing at least one remote message triggered by a first single source compute node (A) sending a single message, wherein the DMA engines of the interconnected compute nodes comprise:
   a processor interface for communicating with said plurality of processors;
   DMA logic;
   injection and reception byte counters;
   injection and reception FIFO metadata;
   a memory interface; and
   a DMA network interface
wherein the first compute node (A) implements at least one $3^{rd}$ party send by sending a single remote get message including at least one remote message descriptor to a remote second compute node (B), which upon receipt controls the DMA engine to pass at least one data message corresponding to the at least one remote message descriptor, and,
wherein the remote second compute node (B) sends said at least one data message to a third remote compute node (C).

6. The parallel computer system as set forth in claim 5, wherein remote second compute node (B) sends said multiple data messages to the first compute node (A).

7. The parallel computer system as set forth in claim 5, wherein remote second compute node (B) sends multiple data messages to multiple compute nodes, where each of the multiple data messages corresponds to each of multiple message descriptors.

8. The parallel computer system as set forth in claim 5, wherein said remote message includes multiple remote message descriptors, and controls the DMA engine at the remote second compute node (B) to pass a second message comprising said multiple remote message descriptors to a remote third compute node (C).

9. The parallel computer system as set forth in claim 8, wherein the DMA engine at the remote third compute node (C) receives the second remote message from remote compute node (B) and sends a third remote message including multiple remote message descriptors to a remote fourth compute node (D).

10. The parallel computer system as set forth in claim 9, wherein said remote fourth compute node (D) sends multiple messages, each of which corresponding to one of said multiple remote message descriptors.

11. The parallel computer system as set forth in claim 9, wherein said second remote message includes message data comprising multiple remote message descriptors, which upon receipt the DMA engine in the third compute node (C), controls said DMA engine to transfer multiple remote messages to multiple compute nodes.

12. The parallel computer system as set forth in claim 5, wherein said single source first compute node (A), by preparing and sending the remote message to a remote second compute node (B), controls remote second compute node (B) to send subsequent messages for controlling compute nodes remote from compute node (B).

13. A method for passing remote messages in a parallel computer system comprising a network of interconnected compute nodes, wherein a first compute node (A) sends a single remote message to a remote second compute node (B) in order to control said remote second compute node (B) to send at least one remote message, the method comprising:
   controlling a DMA engine at first compute node (A) to prepare the single remote message to include a first message descriptor and at least one remote message descriptor for controlling remote second compute node (B) to send at least one message, including putting the first message descriptor into an injection FIFO at the first compute node (A) and sending the single remote message and the at least one remote message descriptor to the second compute node (B);
   receiving the single remote message and the at least one remote message descriptor at the remote second compute node (B), wherein the DMA engine puts the remote message descriptors into an injection FIFO; and
   said DMA engine then sending multiple messages to first compute node (A) based on said remote message descriptors.

14. The method for passing as set forth in claim 13, wherein said at one remote message descriptor included in said single remote message initiated at first compute node (A) comprises a get packet, wherein the get packet includes the at least one remote message descriptor to be passed in at least one second remote message to at least a remote third compute node (C), in order to control a corresponding DMA engine at remote third compute node (C) to send at least one remote message.

15. The method for passing as set forth in claim 13, further including a step whereby a DMA engine at the remote second compute node (B) puts the at least one remote message descriptor into its injection FIFO, and sends at least one second remote message to the remote third compute node (C).

16. The method for passing as set forth in claim 13, wherein the step of controlling further comprises that the DMA engine at the first compute node (A) prepares the single remote message for sending to remote second compute node (B) to include multiple remote $3^{rd}$ party message descriptors, for controlling a DMA engine at remote second compute node (B) to compel compute nodes remote from compute node (B) to send multiple messages.

17. The method for passing as set forth in claim 16, wherein said multiple remote messages are sent to a remote third compute node (C).

18. The method for passing as set forth in claim 13, wherein all of the multiple messages passed are controlled by respective DMA engines but for a preparation of the first message descriptor and the at least message descriptor at said first compute node (A) without need for interaction by respective compute node processors.

19. The method for passing as set forth in claim 13, wherein the step of controlling the DMA engine at the first compute node (A) includes preparing the remote message to include two (2) remote message descriptors, a first of which comprising a remote get targeting the remote second compute node (B), and a second of which comprising a remote put, for controlling the remote second compute node (B) to send message data to a remote third-party compute node (C), the message data at the remote third-party compute node (C) including a get targeting at least one remote fourth-party compute node (D).

20. A computer program product, the computer program product comprising:
   a tangible storage medium readable by a processing circuit and storing instructions for execution by the processing circuit for performing a method for passing remote messages in a parallel computer system comprising a network of interconnected compute nodes, wherein a first compute node (A) sends a single remote message to a remote second compute node (B) in order to control said remote second compute node (B) to send at least one remote message, the method comprising:

controlling a DMA engine at first compute node (A) to prepare the single remote message to include a first message descriptor and at least one remote message descriptor for controlling remote second compute node (B) to send at least one message, including putting the first message descriptor into an injection FIFO at the first compute node (A) and sending the single remote message and the at least one message descriptor to the second compute node (B);

receiving the single remote message and the at least one remote message descriptor at the remote second compute node (B), wherein the DMA engine puts the remote message descriptors into an injection FIFO; and said DMA engine then sending multiple messages to first compute node (A) based on said remote message descriptors.

21. The computer program product for passing as set forth in claim 20, wherein said at one remote message descriptor included in said single remote message initiated at first compute node (A) comprises a get packet, wherein the get packet includes the at least one remote message descriptor to be passed in at least one second remote message to at least a remote third compute node (C), in order to control a corresponding DMA engine at remote third compute node (C) to send at least one remote message.

22. The computer program product for passing as set forth in claim 20, further including a step whereby a DMA engine at the remote second compute node (B) puts the at least one remote message descriptor into its injection FIFO, and sends at least one second remote message to the remote third compute node (C).

23. The computer program product for passing as set forth in claim 22, wherein said multiple remote messages are sent to a remote third compute node (C).

24. The computer program product for passing as set forth in claim 20, wherein the step of controlling further comprises that the DMA engine at the first compute node (A) prepares the single remote message for sending to remote second compute node (B) to include multiple remote $3^{rd}$ party message descriptors, for controlling a DMA engine at remote second compute node (B) to compel compute nodes remote from compute node (B) to send multiple messages.

25. The computer program product for passing as set forth in claim 20, wherein all of the multiple messages passed are controlled by respective DMA engines but for a preparation of the first message descriptor and the at least message descriptor at said first compute node (A) without need for interaction by respective compute node processors.

26. The computer program product for passing as set forth in claim 20, wherein the step of controlling the DMA engine at the first compute node (A) includes preparing the remote message to include two (2) remote message descriptors, a first of which comprising a remote get targeting the remote second compute node (B), and a second of which comprising a remote put, for controlling the remote second compute node (B) to send message data to a remote third-party compute node (C), the message data at the remote third-party compute node (C) including a get targeting at least one remote fourth-party compute node (D).

* * * * *